United States Patent Office 3,132,188
Patented May 5, 1964

3,132,188
PREPARATION OF DEUTERATED
AROMATIC MATERIALS
Denys Cook, Sarnia, Ontario, Canada, assignor to The Dow Chemical Company, Midland, Mich., a corporation of Delaware
No Drawing. Filed Nov. 2, 1961, Ser. No. 149,509
3 Claims. (Cl. 260—668)

This invention relates to the preparation of deuterated aromatic materials and is more particularly concerned with a single step method of preparing high purity deuterated benzene.

Preparation of deuterobenzene has been accomplished usually by the decomposition of Grignard reagents with heavy water. In this method, half the valuable deuterium atoms go into a generally not wanted $Mg(OD)_2$. Also the method requires tedious work-up and difficult separation of the desired deuterobenzene.

It has now been found that deuterobenzene or its lower alkyl derivatives may be readily prepared by (a) the reaction of an appropriate pyridine hydrohalide with an appropriate water-soluble alkali metal tetraphenyl boron in the presence of heavy water ($D_2O$), (b) the removal of unreacted heavy water, (c) the decomposition of the resulting complex by heat and (d) the recovery of high purity deuterated benzene from the reaction mixture.

Appropriate pyridines have the formula:

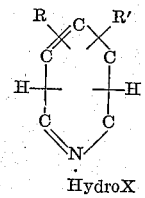

HydroX wherein X is a halogen, either chlorine, bromine or iodine, hydro is hydrogen or deuterium and R and R' are hydrogen or lower alkyl groups containing up to 3 carbon atoms. Appropriate water-soluble boron compounds have the formula:

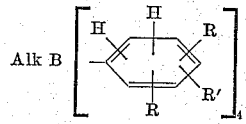

wherein Alk is lithium, sodium, potassium, cesium, rubidium or ammonium and R and R' are hydrogen or lower alkyl groups containing up to 3 carbon atoms. Since the lithium and sodium salts are more soluble in $D_2O$, they are preferred.

The appropriate pyridine salt and alkali metal tetraphenyl boron are contacted in heavy water. A precipitate will ordinarily form. Equimolecular quantities of the pyridine and boron material are usually employed, however, other ratios can be used if desired. Sufficient heavy water is usually employed to have complete solution of the starting materials, thereby avoiding contamination of the reaction product.

After the precipitate has formed, the unreacted heavy water is removed, as by evacuating the reaction vessel, centrifugation, decantation, etc., and the precipitate thereafter heated to between about 50 and 150 degrees centigrade, thereby to distill the deuterated benzene from the reaction mixture. Monodeuterobenzene thus prepared has a high degree of purity and uses the heavy water in good efficiency.

The following examples are given for the purposes of illustration and are not to be construed as limiting the invention thereto.

Example 1

Pyridine hydochloride (1.18 parts) was dissolved in 3 parts of heavy water ($D_2O$). Sodium tetraphenyl boron (3.48 parts) was dissolved in 20 parts of $D_2O$. The two resulting solutions were mixed to produce a dense white precipitate, probably $(C_5H_5ND)^+(B(C_6H_5)_4)$. Excess $D_2O$ was removed by evacuating the reaction vessel and the vessel thereafter heated to about 100 degrees centigrade. A distillate was collected in a condenser and receiver. Infrared analysis of the distillate showed the material to be pure deuterated benzene ($C_6H_5D$). The yield was 0.51 part or 62.5 percent of theoretical.

Example 2

In a manner similar to that of the foregoing example pyridine deutero- or hydrobromide, pyridine deutero- or hydroiodide, or pyridine deuterochloride may be substituted for the pyridine hydrochloride specifically shown. Similarly, 2-methylpyridine, 2-ethylpyridine, 2-propylpyridine, 2-isopropylpyridine, 3-methylpyridine, 3-ethylpyridine, 3-propylpyridine, 3-isopropylpyridine, 4-methylpyridine, 4-ethylpyridine, 4-propylpyridine, 4-isopropylpyridine, 2,6-dimethylpyridine, 2,6-diethylpyridine, 2,6-dipropylpyridine, 2,6-diisopropylpyridine, 2,4-dimethylpyridine, 2,4-diethylpyridine, 2,4-dipropylpyridine, 2,3-dimethylpyridine, 2,5-dimethylpyridine, 3-methyl-6-ethylpyridine, etc. may be substituted for the pyridine specifically shown. Also, potassium, lithium, cesium or rubidium may be substituted for the sodium specifically shown. Each of the above substitutions will give results similar to those shown in Example 1. Similarly the phenyl group may be replaced by 2-, 3- or 4-tolyl; 2-, 3- or 4-ethylphenyl; 2-, 3- or 4-propylphenyl; 2-, 3- or 4-isopropylphenyl; 2,3-, 2,4-, 2,5-, 2,6-, or 3,4-xylyl; 2-methyl-3-ethylphenyl; 2-methyl-3-propylphenyl; 2-methyl-3-isopropylphenyl; 2,3-, 2,4-, 2,5-, 2,6-, or 3,4-diethylphenyl; etc. to prepared alkyl substituted deuterobenzene. For example, sodium tetra (2-tolyl) boron will produce ortho-deuterotoluene; sodium tetra (2-ethyl-4-propylphenyl) boron will produce 1-deutero-2-ethyl-4-propylbenzene; etc.

Various modifications may be made in the present invention without departing from the spirit or scope thereof and it is to be understood that I limit myself only as defined in the appended claims.

I claim:
1. The process which comprises contacting, in the presence of deuterium oxide, a pyridine hydrohalide having the formula:

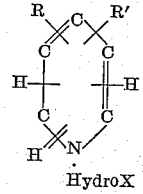

HydroX with an alkali metal tetraphenyl boron having the formula:

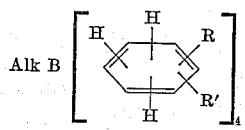

wherein X is selected from the group consisting of chlorine, bomine and iodine, wherein hydro is selected from the group consisting of hydrogen and deuterium, wherein Alk is selected from the group consisting of sodium, potassium, lithium, cesium, ammonium, and rubidium, and wherein R and R' are independently selected from the group consisting of hydrogen and lower alkyl containing up to 3 carbon atoms, heating the precipitate thus formed at a temperature between about 50 and about 150 degrees centigrade, and separating a product having the formula:

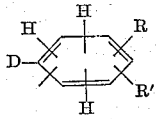

wherein R and R' have the hereinbefore assigned values and D is deuterium.

2. The process which comprises contacting, in the presence of deuterium oxide, a pyridine hydrohalide having the formula:

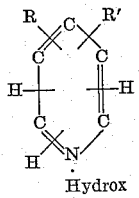

with an alkali metal tetraphenyl boron having the formula:

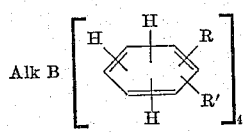

wherein X is selected from the group consisting of chlorine, bromine and iodine, wherein hydro is selected from the group consisting of hydrogen and deuterium, wherein Alk is selected from the group consisting of sodium, potassium, lithium, cesium, ammonium and rubidium, and wherein R and R' are independently selected from the group consisting of hydrogen and lower alkyl containing up to 3 carbon atoms, heating the precipitate thus formed at a temperature of about 100 degrees centigrade and separating a product having the formula:

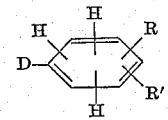

wherein R and R' have the hereinbefore assigned values and D is deuterium.

3. The process which comprises contacting, in the presence of deuterium oxide, pyridine hydrochloride with sodium tetraphenyl boron; heating the precipitate thus formed at a temperature between about 50 and about 150 degrees centigrade, and separating a monodeuterobenzene from the reaction mixture.

No references cited.